United States Patent
Zhang et al.

(10) Patent No.: US 11,900,424 B2
(45) Date of Patent: *Feb. 13, 2024

(54) AUTOMATIC RULE GENERATION FOR NEXT-ACTION RECOMMENDATION ENGINE

(71) Applicant: salesforce.com, inc., San Francisco, CA (US)

(72) Inventors: Yuxi Zhang, San Francisco, CA (US); Kexin Xie, San Mateo, CA (US); Shrestha Basu Mallick, San Francisco, CA (US); Darrell Grissen, Boston (CA)

(73) Assignee: Salesforce, Inc., San Francisco, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 17/563,874

(22) Filed: Dec. 28, 2021

(65) Prior Publication Data

US 2022/0198529 A1    Jun. 23, 2022

Related U.S. Application Data

(63) Continuation of application No. 16/520,556, filed on Jul. 24, 2019, now Pat. No. 11,210,712.

(51) Int. Cl.
  *G06Q 30/02* (2023.01)
  *G06Q 30/0251* (2023.01)
  *G06Q 30/0201* (2023.01)

(52) U.S. Cl.
  CPC ..... *G06Q 30/0281* (2013.01); *G06Q 30/0201* (2013.01); *G06Q 30/0271* (2013.01)

(58) Field of Classification Search
  CPC .................................................... G06Q 30/02
  See application file for complete search history.

(56) References Cited

U.S. PATENT DOCUMENTS

| | | |
|---|---|---|
| 2007/0129993 A1 | 6/2007 | Alvin |
| 2007/0239535 A1 | 10/2007 | Koran |
| 2008/0103876 A1 | 5/2008 | Armstrong |
| 2009/0106081 A1 | 4/2009 | Burgess |
| 2011/0014972 A1 | 1/2011 | Herrmann |

(Continued)

OTHER PUBLICATIONS

Emden, Robin, et al., "contextual: Evaluating Contextual Multi-Armed Bandit Problems in R," arXiv preprint arXiv:1811.01926, Nov. 8, 2018, 55 pages.

*Primary Examiner* — Vincent M Cao
(74) *Attorney, Agent, or Firm* — Butzel Long; Donald J. Lecher

(57) ABSTRACT

A system can recommend a next action for a user. A memory can store user data corresponding to the user and can include historic interaction points. A behavior pattern can be identified based on two or more interaction points stored in the user data. An intent of the user based on the behavior pattern can be identified. The intent can be based on a previous behavior pattern of another user. Several probabilities that the user will meet one or more objectives can be determined based on the intent. The probabilities can be scored using and used to assign a policy to the first user. A next action can be recommended based on the policy and executed with respect to the user. The outcome of the recommended next action can be stored to the user data.

18 Claims, 4 Drawing Sheets

(56) References Cited

U.S. PATENT DOCUMENTS

| | | | |
|---|---|---|---|
| 2011/0252330 A1* | 10/2011 | Catlin | G06Q 30/0244 |
| | | | 715/738 |
| 2014/0278308 A1 | 9/2014 | Liu | |
| 2014/0297363 A1 | 10/2014 | Vemana | |
| 2015/0161658 A1 | 6/2015 | Little | |
| 2015/0178749 A1 | 6/2015 | Meng | |
| 2015/0254675 A1* | 9/2015 | Kannan | G06Q 30/02 |
| | | | 705/304 |
| 2016/0034948 A1 | 2/2016 | Zhong | |
| 2016/0140577 A1 | 5/2016 | Morley | |
| 2017/0094058 A1* | 3/2017 | Piaggio | G06Q 30/0201 |
| 2018/0108048 A1* | 4/2018 | Yoon | G06Q 30/0271 |
| 2018/0176312 A1 | 6/2018 | Smietana | |

* cited by examiner

AUTOMATIC RULE GENERATION FOR NEXT-ACTION RECOMMENDATION ENGINE

BACKGROUND

Organizations that store user data may employ a variety of analysis and recommendation techniques to better address their users' needs and to help reach various goals. The organizations may hire technical experts to develop customized mathematical constructs and predictive models, which may be costly. The customized solution may be tailored to the particular problem at a given point in time and unable to accommodate changes to the underlying data architecture, types of data, and changing demands and interests of the user as the organization scales. Similarly, software-based approaches using rule-based or simple user affinity schemes may be unable to operate on a large scale with rich, diverse engagement events and progressive stages of the user experience.

BRIEF SUMMARY

According to an embodiment of the disclosed subject matter, a computer-implemented method for recommending a next action for a user of a plurality of users may include receiving user data corresponding to a first user of the plurality of users. The user data may be stored in a memory storage device and including a plurality of historic interaction points. The method may further include identifying a first behavior pattern based on two or more interaction points of the plurality of interaction points. The method may further include identifying an intent of the first user based on the first behavior pattern. The intent may be based on a second behavior pattern of a second user of the plurality of users. The method may further include determining a plurality of probabilities that the first user will meet each of a plurality of objectives based on the intent. The method may further include scoring each of the plurality of objectives based on the plurality of probabilities. The method may further include assigning a policy from a plurality of policies to the first user based on the scoring. The policy may be based on a mapping between the user data and one or more actions of a plurality of actions associated with the policy. The method may further include recommending a next action from the plurality of actions associated with the assigned policy. The method may further include executing the recommended next action with respect to the first user and storing an outcome of the recommended next action to the user data. The interaction points may include interactions and non-interactions of the first user. The executing may include prompting the first user to provide additional information and/or prompting the first user to complete a transaction. The assigned policy may correspond to a first objective of the plurality of objectives having a greater probability that the first user will meet the first objective than a second objective of the plurality of objectives. The assigned policy may be a policy of a second type and may be assigned based on determining that a policy of a first type could not be identified. The recommending of the next action may include determining that the next action is more suitable for the first user than another action of the plurality of actions. The method may further include updating one or more policies of the plurality of policies in response to and based on the outcome of the recommended next action. A first objective of the plurality of objectives may include two or more stages. The method may further include rewarding the first user in response to advancing to a subsequent stage from a prior stage. The subsequent stage may be progressively closer to fulfilling the objective than the prior stage.

According to an embodiment of the disclosed subject matter, a system for recommending a next action for a user of a plurality of users may include a memory storage device configured to store user data corresponding to a first user of the plurality of users and a plurality of historic interaction points. One or more processors may be configured to identify, using a first model, a first behavior pattern based on two or more interaction points of the plurality of interaction points. The one or more processors may be further configured to identify, using a first model, an intent of the first user based on the first behavior pattern, the intent based on a second behavior pattern of a second user of the plurality of users. The one or more processors may be further configured to determine, using the first model, a plurality of probabilities that the first user will meet each of a plurality of objectives based on the intent. The one or more processors may be further configured to score, using the first model, each of the plurality of objectives based on the plurality of probabilities. The one or more processors may be further configured to assign, using the first model, a policy from a plurality of policies to the first user based on the scoring, the policy based on a mapping between the user data and one or more actions of a plurality of actions associated with the policy. The one or more processors may be further configured to recommend, using a second model, a next action from the plurality of actions associated with the assigned policy. The one or more processors may be further configured to execute the recommended action with respect to the first user. The one or more processors may be further configured to store an outcome of the recommended next action to the user data of the memory storage device. The interaction points may include interactions and non-interactions of the first user. The recommended next action may prompt the user to provide additional information or to complete a transaction. The assigned policy may correspond to a first objective of the plurality of objectives having a greater probability that the user will meet the first objective than a second objective of the plurality of objectives. The assigned policy may be a policy of a second type and may be assigned based on determining that a policy of a first type could not be identified. The one or more processors may be further configured to determine that the next action is more suitable for the user than another action of the plurality of the actions. The one or more processors may be further configured to update one or more policies of the plurality of policies in response to and based on the outcome of the recommended next action. A first objective of the plurality of objectives may include two or more stages. The one or more processors may be further configured to reward the user in response to advancing to a subsequent stage from a prior stage. The subsequent stage may be progressively closer to fulfilling the objective than the prior stage.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
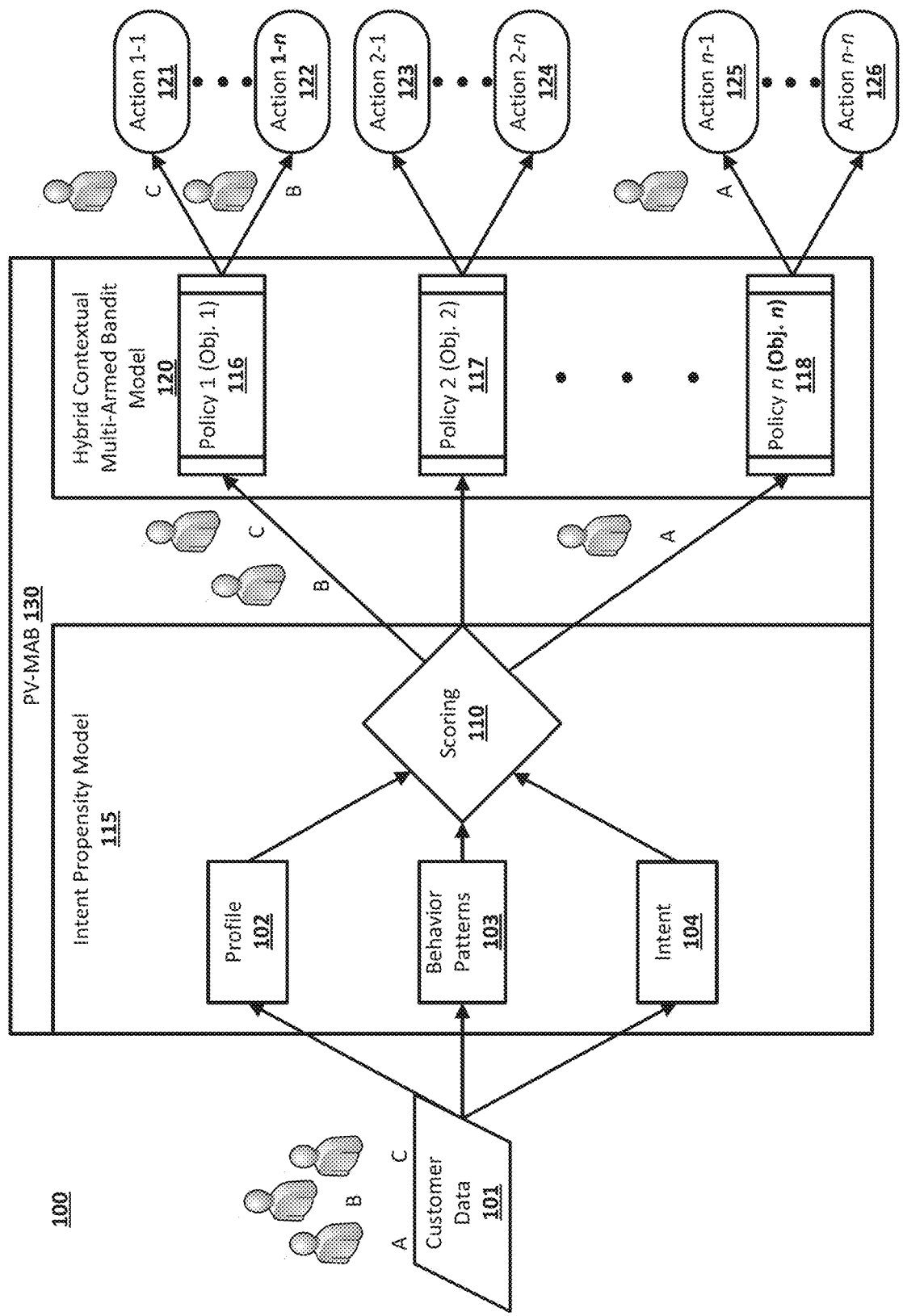
FIG. 1 shows an example of a system according to an embodiment of the disclosed subject matter.

Organizations may employ various recommendation and analysis techniques to better address the needs of their users and to help reach their goals. Next best action (NBA) is a personalized user engagement technique that recommends the next best action for a user based on his or her unique history of interactions, non-interactions, and unique profile characteristics. NBA may be used to help a user or other user progress toward business goals as quickly and smoothly as possible. It should be appreciated that while the term "next best action" or NBA will be used throughout the following disclosure, the next best action may not necessarily be the best, but rather, merely better than or even equivalent to one or more alternative actions. Furthermore, whether or not an action is "best" or "better" than another action may be evaluated based on a number of criteria, which may vary between implementations. Thus, there may not be an objectively "best" action but, rather, a "best" or "better" action according to a particular model and desired outcome(s). Similarly, in some implementations more than one action may be simultaneously the "best", i.e., there may be equally-good or -desirable actions, any one or more of which may be selected as a "next best" action according to the particular implementation, using selection rules in addition to, or included in, the implementation. Implementations disclosed herein therefore may recommend a "next action", which may not necessarily be the single "best" action but rather may be an acceptable, desirable, equally good, or similar action from among multiple possible actions, using NBA techniques as disclosed herein.

The present subject matter discloses an interaction management system that may orchestrate marketing actions on various channels and platforms. The interaction management system may include a recommendation engine that embraces NBA principles. The recommendation engine may perform its analysis based on real-world customer data that may be incomplete, non-existent, duplicative, inconsistent, and/or biased in some respect. While the interaction management system may will be described in terms of customers and customer data, it should be appreciated that the disclosed subject matter may be equally applicable to end users, partners, students, members, consumers, players, and the like whose interactions within a system may be observed or recorded. For example, the disclosed subject matter may also be applicable to recommend selections for a fantasy sports team based on available player data that includes one or more of player profile data and prior performance data. Where a customer's interaction history or profile characteristics is limited by any of these issues, an NBA recommendation may be generated to prompt the customer or otherwise elicit additional information. Each possible NBA within the set of all possible NBA recommendations may be dynamically added and/or removed at any time for any reason, such as seasonal changes or shifts in business strategies, for example. In general, the objective of the interaction management system may be to direct the customer toward one or more target goals, such as a completed sale, selection of a desired product or group of products, providing desired information to the system, or to a more preferred stage within a series of stages that are designed to progress toward the target goal.

Conventional classification or regression machine learning models may be incapable of providing the features previously discussed. For example, conventional machine learning approaches may be unable to generate a satisfactory model where more than one objective or acceptable result may exist. Similarly, conventional machine learning approaches may be insufficient in that a resultant output in the training data may only be ascertained for the actions that were taken, whereas the results for other possible actions at any given engagement stage are unknown. Accordingly, the present subject matter discloses a variant hybrid contextual multi-armed bandit model (PV-MAB) to achieve the previously-discussed features and address the deficiencies of the conventional machine learning approaches. The PV-MAB may pursue multiple objectives through multiple policies based on classification and multi-policy reinforcement learning principles.

The interaction management system may recommend an NBA based on a customer "journey." The customer journey may be representative of, for example, acts, views, selections, reviews, ratings, communications, purchases, returns, and other interactions performed by the customer. Additionally, the customer journey may represent non-interactions where an opportunity for interaction was presented, but interactions were not conducted by the customer. For example, the customer journey may represent that a customer purchased a product, but also that the customer did not review the product. A customer journey may occur across various channels and organizations. For example, a customer journey may include visits with various organization websites, transactions at an automated teller machines, calls to customer service centers, e-mails with various organization contacts, and other points of interaction. At each opportunity for a customer interaction, an interaction point may be determined and recorded in the customer journey, along with a customer's response or non-response. As used herein, the term interaction point refers to a point during the customer journey where the customer has interacted with another entity, such as a call center, e-mail contact, instant message, automated teller machine, website, and the like. The interaction point may occur across channels and organizations. The interaction point may even occur where the customer does not respond. For example, an entity may transmit an offer or otherwise attempt to interact with the customer by sending an SMS/text message advertisement, and the customer may ignore it.

FIG. 1 illustrates an example of an interaction management system 100 that supports generating an NBA recommendation in accordance with various aspects of the present disclosure. System 100 includes customer data 101, which may include data corresponding to one or more customers. It should be appreciated that a customer may correspond to a single person, a group of persons, an organization, a web-based client, a mobile application, an application programming interface, or the like. Customer data 101 may be indexed by customer name, identification number, e-mail address, or other unique identifier, and may include a list of interactions for each indexed customer. As previously-discussed, an interaction may refer to an act performed by a customer or may refer to the absence of an act, and the interaction may occur in response to an offer provided to the customer. Customer data 101 may be fully-inclusive, including every interaction performed by each customer across a variety of channels and organizations. Alternatively, or in addition, the stored interactions may be a subset of all customer interactions that are of interest to the users or administrators of interaction management system 100. In an example, customer data 101 may include only interactions pertaining to professional sports. In another example, customer data 101 may include only interactions pertaining to a specific retail product. Interactions may also be the result of an NBA recommended that resulted in an offer or proposition provided to a customer. Two or more customer interactions may be combined, merged, linked, reconciled, or integrated within customer data 101. These operations may be performed, for example, to reduce the amount of data to be processed by one or more components in subsequent stages of interaction management system 100.

Customer data 101 may include profile information corresponding to one or more customers. Profile information may generally refer to a collection of data about a customer, such as name, title, phone number, a photo, a biographical summary, status, age, sex, geographical location, education, profession, income, and the like. Profile information may also include customer affinities that may be provided by the customer or determined based on past customer propositions and behavior patterns. Customer affinities may include, for example, the customer's past and present interests, habits, routines, and the like.

PV-MAB 130 may include one or more machine learning models. In an example, PV-MAB 130 may include an intent propensity model 115 and a hybrid contextual multi-armed bandit model (HCMABM) 120. Both intent propensity model 115 and HCMABM 120 may train and re-train continuously as data is added, removed, and changed in customer data 101. In this way, both models 115 and 120 may be said to train in real-time. In an example, customer data 101 may include profile data 102 and journey data for customers A, B, and C, as shown. The customer data 101 may be input to the intent propensity model 115, which may output a selected policy of a plurality of policies (116-118) that may be applied to a customer, such as customers A, B, and C. Intent propensity model 115 may be implemented by a multi-class classification model. Each of Policies 1 through n (116-118) may be targeted to achieving a corresponding business objective 1 through n by identifying one or more actions that are likely to lead the customer to achieving the corresponding business objective. A policy may be based on a mapping between customer data 101 and one or more actions 121-126 that have been historically shown to direct a customer reach the corresponding business objective. A business objective may be, for example, ticket sales, a greater engagement rate, and the like. The journey data stored in customer data 101 may be used by the intent propensity model 115 to determine behavior patterns 103. The term behavior pattern, as used herein, refers to a sequence of interactions and/or non-interactions that may be repetitive, may be consistently identified, and may be common to more than one customer. Behavior patterns may also take factors into consideration that may not be controlled by the customer, such as time, date, and weather. Identified behavior patterns may be useful in predicting a customer's intent 104. For example, a customer may exhibit a behavior pattern where he or she visits a film review website on a Friday evening and subsequently directs a navigation application to provide directions to a nearby theater. This behavior pattern may be identified and/or repeated, even where other interactions are inserted in between, may be common to other customers, and may that signal that the customer intends to purchase movie tickets on the same day. Based on analyzing either the profile data 102 or behavior patterns 103 alone or in combination with one another, intent propensity model 115 may determine the intent 104, which may reflect the customer's interests. Intent 104 may be expressed as a customer's predicted interest and a quantity that may represent the confidence of intent 104. For example, behavior patterns 103 and/or profile data 102 may reveal that a customer's interactions have been correlated with completing a sale, such as by asking questions to salespersons, comparing products on a website, or adding products to a shopping cart. Certain interactions or series of interactions may indicate a greater confidence of intent 104 as opposed to others, which may convey more ambiguity surrounding the customer's intent 104. In this example, intent 104 may signal that the customer intends to make a purchase and may indicate 90% confidence. On the other hand, behavior patterns 103 and/or profile data 102 may reveal that a customer is interacting in ways that have been correlated with not completing a sale, such as by browsing for short durations. Alternatively, or in addition, a customer's profile data 102 may support an intent 104 to not complete a sale based on incompatibilities with the products being viewed by the customer. In this example, intent 104 may signal that the customer does not appear to intend to make a purchase, with 40% confidence. The confidence metric may be based on the quantity of customer data 102 available to support a correlation with intent 104. The intent propensity model 115 may be trained separately from the hybrid contextual multi-armed bandit model 120 using training data that includes features extracted from one or more of profile data 102 and behavior patterns 103. Training may occur at periodic intervals and/or in real-time in response to each update to customer data 101. Based on one or more of the profile data 102, behavior patterns 103, and intent 104, intent propensity model 115 may determine a business objective suitable for each customer, and/or such that the customer has a greater likelihood of meeting the business objective based on the current interaction environment and context. A scoring process 110 may rank the probabilities for each customer of reaching the one or more business objectives. The scoring process 110 may also utilize knowledge of customers with similar profile characteristics or with similar aspects in their respective customer journeys to assess the probabilities that each customer will reach the one or more business objectives. In an example, any number of business objectives may be utilized, denoted in FIG. 1 as any number between 1 and n. In an example and as shown in FIG. 1, based on the results of scoring process 110, intent propensity model 115 may determine that customers B and C are more likely to reach business objective 1 and should be assigned to corresponding Policy 1 116. Policy 1 116 may be designed to assist a customer in reaching business objective 1. Similarly, based on the scoring process 110, intent propensity model 115 may determine that customer A is more likely to reach business objective n and should be assigned to corresponding Policy n 118. Policy n 118 may be designed to assist a customer in reaching business objective n. It should be appreciated that the selection of a Policy 1 through n (116-118) by intent propensity model 115 to be applied to a customer may change with each successive interaction point reached by the customer or may remain the same for one or more successive interaction points depending on the result of the analysis. Intent propensity model 115 may execute on any customer data 101 for any customer at any time, but preferably executes on customer data 101 for a customer that has reached a new interaction point or whose contextual situation has changed. Intent propensity model 115 may also execute on customer data 101 at any time, on a periodic schedule, such as monthly, weekly, daily, and the like.

Following assignment of the customers to one or more of Policies 1-n, HCMABM 120, based on one or more of profile data 102, behavior patterns 103, intent 104, assigned policy, and other additional contextual information, may recommend an NBA for a customer. HCMABM may be implemented using reinforcement learning and may perform counterfactual risk minimization. In an example, Actions 1-1 121 through 1-n 122 may correspond to Policy 1 116 that may assist a customer in reaching business objective 1. Similarly, Actions 2-1 123 through 2-n 124 may correspond to Policy 2 117 that may assist a customer in reaching business objective 2, while Actions n–1 125 through n-n 126 may correspond to Policy n 118 that may assist a customer in reaching business objective n. It should be appreciated that there may be any number of actions corresponding to a policy and business objective. From the one or more actions corresponding to a policy, HCMABM 120 may select a recommended NBA for a customer. In an example and as shown in FIG. 1, HCMABM 120 may determine that the recommended NBA for customer C is Action 1-1 121, while the recommended NBA for customer B is Action 1-n 122, and Action n–1 125 is recommended for customer A. It should be appreciated from this example that any number of customers, including both customer B and customer C, may be recommended the same NBA. In general, customers assigned by intent propensity model 115 to a policy may be assigned by HCMABM 120 to actions that correspond to the same policy.

Various policies and associated business objectives may be advanced by PV-MAB 130. HCMABM 120 may target and prompt customers to reach a small set of high-value goals, such as purchases or other transactions. This may be termed a goal-oriented policy. In an example, a goal-oriented policy may be designed to encourage customer A to purchase football tickets, while customer B, having different intent and/or interests, may be encouraged to purchase a football jersey. A goal-oriented policy may correspond to one or more of Policies 1 through n (116-118) selected by intent propensity model 115. An example of a goal. A goal-oriented policy may reward reaching goals equally and may utilize a One Vs Rest classification predictor as a kernel function to predict which Action (121-126) is more likely to lead to achieving the goals. Goal-oriented policies may include a scoring component that functions similarly to scoring component 110. While scoring component 110 may select customers for assignment to a policy for which they are more likely to achieve the associated objective(s), the scoring component utilized by a goal-oriented policy may select one or more action(s) from the plurality of actions (121-126) associated with a policy for which the customer may be more likely to achieve a goal. Alternatively, or in addition, HCMABM 120 may promote progression into more advanced stages of a customer journey, termed a stage-advancement policy, which may also correspond to one or more of Policies 1 through n (116-118). A stage-advancement policy may be designed to prompt the customer for or otherwise elicit additional information, such as by incentivizing the customer to complete a profile or questionnaire, for example. A stage-advancement policy may reward a customer in a manner that is linked to the progression of stages. A customer that has been assigned to a stage-advancement policy may move forward in the customer journey, skip stages, and/or return to prior stages to allow for performing additional research and evaluation. Where one or more of profile data 102, behavior patterns 103, and intent 104 may reveal that a customer, such as any of customers A-C, may be a more rapid shopper, the HCMABM 120 may recommend an NBA that is more aggressive in terms of achieving business objectives more quickly. Where one or more of profile data 102, behavior patterns 103, and intent 104 may reveal that a customer usually spends more time performing research, the HCMABM 120 may recommend an NBA that advances the customer more gradually through the successive stages of the customer journey. In an example, the HCMABM 120 may do so by comparing the behavior patterns of other customers that are deemed to spend more time performing research with the customer of interest and recommend an NBA that may be more likely to lead the customer to achieving a goal. In this way, the HCMABM 120 may provide a personalized recommendation that appeals to the profile, behavioral patterns, interests, and intent of the customer. The reward system for a stage-advancement policy may be structured such that the customer may be rewarded for positive advancement to a subsequent stage within the customer interaction system 100 but is rewarded less or not at all for negative or no advancement. Both goal-oriented and stage-advancement policies may incorporate Thompson Sampling with a Gaussian kernel to provide better exploration.

Interaction management system 100 may generate one or more recommended NBAs (121-126) for one or more customers having associated data 101. The hybrid architecture overcomes the limitations of conventional machine-learning models in resolving a more optimal configuration that produces more personalized recommendations while self-adjusting based on the data over time. In an example, a business organization may only set forth its customer business objectives, and the PV-MAB 130 may select and assign the policies and NBAs for each customer on an individualized basis in order to efficiently reach those objectives. Where a customer's profile, behavioral patterns, intent, or interests change, the PV-MAB 130 may reconfigure its approach to improve the likelihood that the customer will continue to advance through successive stages of the customer journey and fulfill the desired business objectives.

Figure 2:
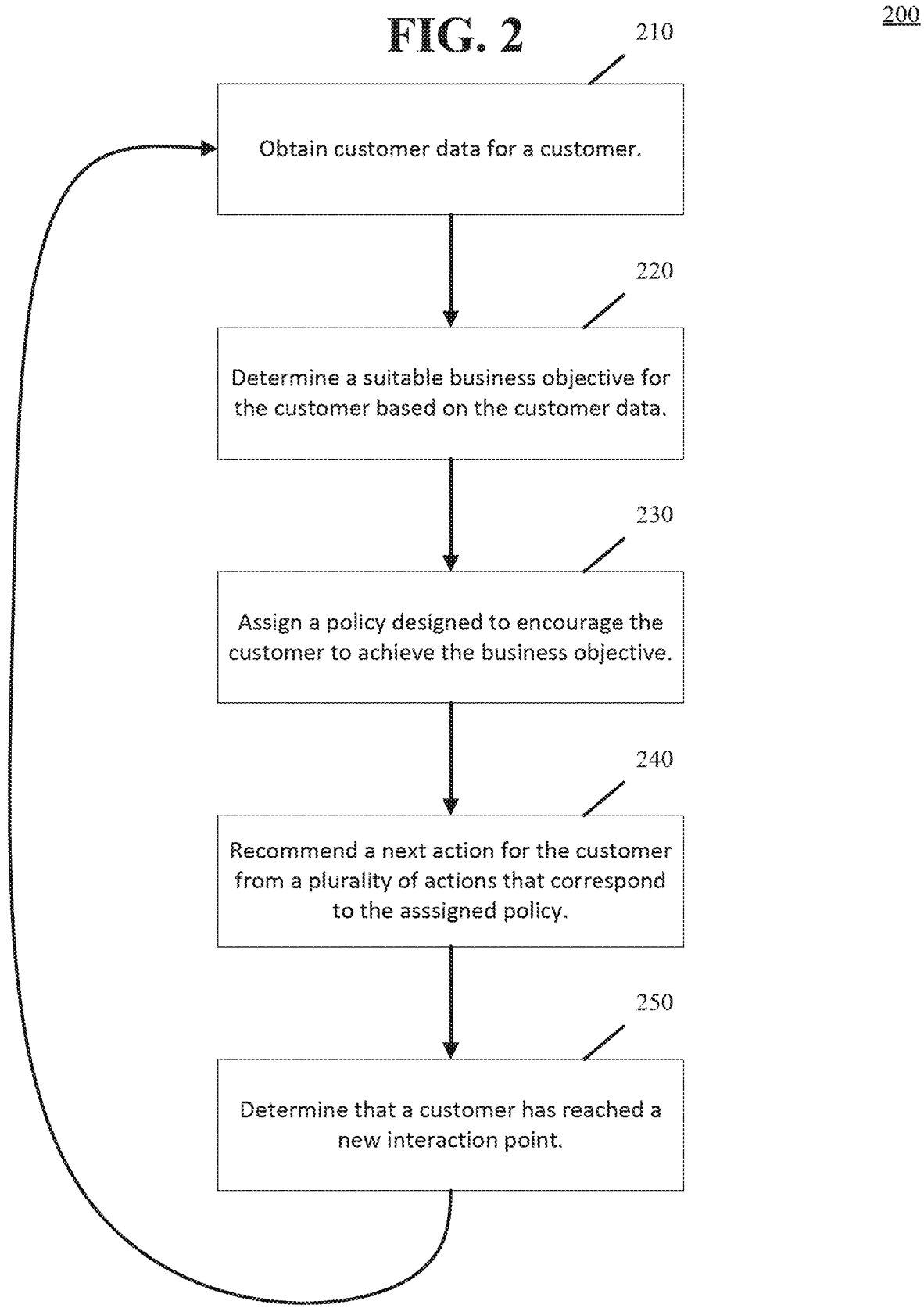
FIG. 2 shows an example process according to an embodiment of the disclosed subject matter.

FIG. 2 is a flow diagram illustrating an example of a method 200 for providing a NBA recommendation for a customer. A process as shown in FIG. 2 may be performed, for example, by customer interaction system 100 or by any other suitable computerized system having access to the appropriate customer data. At 210, customer data 101 associated with the customer journey of a customer may be obtained at intent propensity model 115 of PV-MAB 130. Customer data 101 received during 210 may relate to a single customer, a plurality of customers, or all customers. Preferably only customer data 101 for new customers or customers that have reached a new interaction point to avoid duplicative processing of customer data that is neither new nor changed.

Based on analyzing the customer data 101, the intent propensity model 115 may determine a business objective from a plurality of business objectives suitable for the customer in 220. Determining a suitable business objective may further include analyzing the customer data, organizing the data, adding additional data, removing data, and combining data. Determining a suitable business objective may further include identifying behavior patterns, customer interests, and intent, based on the customer's journey. In an example, behavior patterns may be identified by analyzing the customer journey in various angles, such as the journey angle, proposition angle, and by combining them. In an example, a journey angle may consider one or more stages of a customer's purchasing experience, the channels involved, whether the customer makes decisions impulsively or with considerable research, and what propositions were presented to the customer. A proposition angle may consider the activities that the customers have participated in that are associated with each proposition received by the customer, the one or more stages that the customer has transitioned through, the customer's level of interest or participation with each proposition, whether purchases were made and the quantity, whether a routine was established, and the like. One or more example features of the journey angle may be combined with one or more example features of the proposition angle to generate a unique pattern of behavior for a customer. Determining a suitable business objective may further include scoring the one or more business objectives for each customer based on a probability of reaching the one or more business objectives. Intent propensity model 115 may determine a suitable business objective from any number of business objectives.

In 230, based on the determined business objective, intent propensity model 115 may assign a corresponding policy from the plurality of policies (116-118) to the customer in order to assist in achieving the business objective. One or more policies (116-118) may correspond to an identified business objective, where a policy may be selected from among a plurality of policies based on the customer data 101. Policies may be goal-oriented and/or stage advancement-oriented. A goal-oriented policy may be designed to prompt or encourage a customer to reach one or more high-value goals, such as completing a transaction. A stage-advancement policy may be designed to encourage to prompt the customer for or otherwise elicit additional information. Where a customer's profile, identified behavior patterns, or intent may be sparse, empty, or otherwise inconclusive, a stage-advancement policy may be applied to encourage the customer to change its behavior and to progress toward a more target-rich stage where the PV-MAB 130 may be more effective in creating an appealing personalized recommendation. Where the intent propensity model 115 may determine that a goal-oriented policy may not be identified and assigned to a customer, a stage-advancement policy may be identified and assigned in response to this determination.

Following assignment of a policy to a customer, an NBA may be recommended for the customer in 240. The NBA may be selected from any number of Actions (121-126) that correspond to the assigned policy. Selection of an action as the recommended NBA from the plurality of actions that correspond to the assigned policy may be based on one or more of the profile data 102, behavior patterns 103, intent 104, and other additional contextual information. A single Action (121-126) may be recommended for more than one customer, although preferably, a customer may be recommended only a single Action (121-126).

For a customer that has been recommended an NBA, PV-MAB 130 may periodically determine whether that customer has reached a new interaction point and generated additional data in customer data 101, modified the data in customer data 101, combined the data in customer data 101, or removed data from customer data 101. The determination may occur periodically according to a temporal schedule, such as monthly, weekly, daily, and the like, and/or in response to a flag or signal set by a customer interaction, such that the PV-MAB 130 may adjust the assigned policy and recommend a next best action in real-time. Where PV-MAB 130 determines that a new interaction point has occurred in 250 or otherwise determined the outcome of performing the recommended NBA with respect to the customer, the process 200 may return to step 210 to obtain the new or updated customer data and may repeat steps 220-240 to assess whether the customer should be assigned to a new policy and subsequently recommended a new NBA. Examples of outcomes may be that the customer completes a sale, requests additional information, provides express feedback, or does nothing at all. It should be appreciated that PV-MAB 130 may return to any of steps 210-240 sequentially or accessed randomly. For example, method 200 may recommend a new NBA by repeating stage 240 in response to determining the outcome of offering the prior NBA to a customer without also repeating stages 210-230, or method 200 may perform all of stages 210-240, or a subset of stages 210-240. In this way, the PV-MAB 130 learns automatically based on the outcome of each recommended NBA in real-time by updating one or more of the customer data 101, behavior patterns 103, intent 104, policies 116-118, and the subsequent recommended NBA.

Embodiments disclosed herein may allow for more efficient analysis and recommendation than would be achievable using conventional techniques. For example, an interaction system 100 may be constructed more efficiently than comparable conventional machine learning techniques may achieve, and/or individual recommendations may be provided to a user using fewer computational resources than would be possible using conventional techniques. This is due to the use of the hybrid reinforcement learning techniques as previously disclosed, which allow for rapid development and use of the techniques disclosed herein, without a loss of generality or accuracy. Additionally, embodiments disclosed herein may overcome the associated disadvantages appearing in conventional machine learning techniques where the dataset is incomplete, non-existent, duplicative, inconsistent, and/or biased in some respect.

Figure 3:
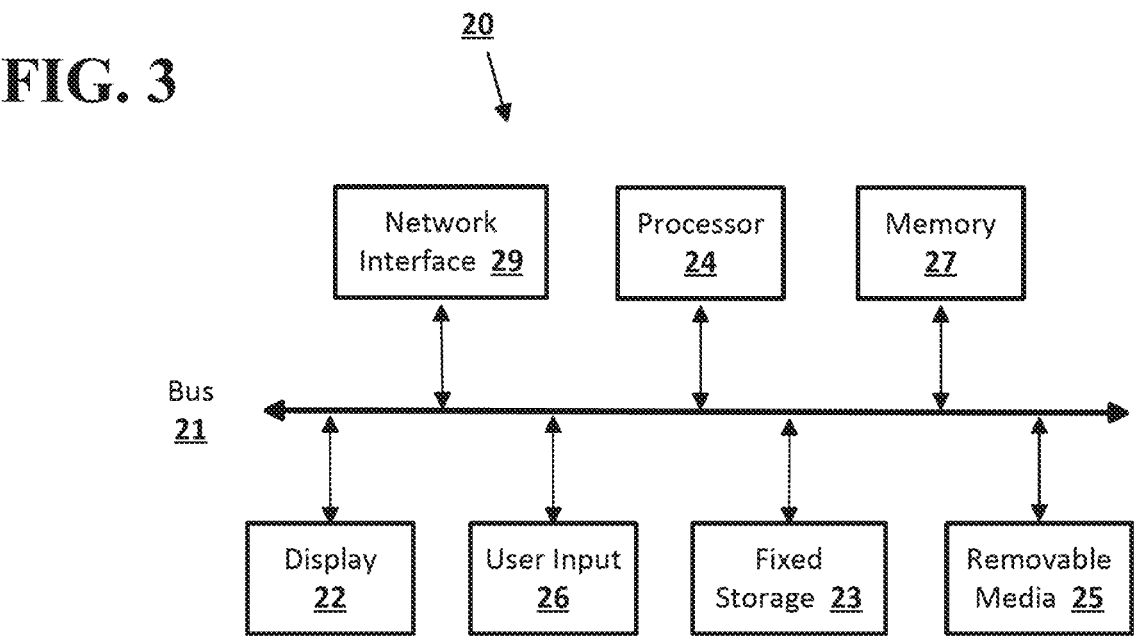
FIG. 3 shows a computing device according to an embodiment of the disclosed subject matter.

Embodiments of the presently disclosed subject matter may be implemented in and used with a variety of component and network architectures. FIG. 3 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Figure 4:
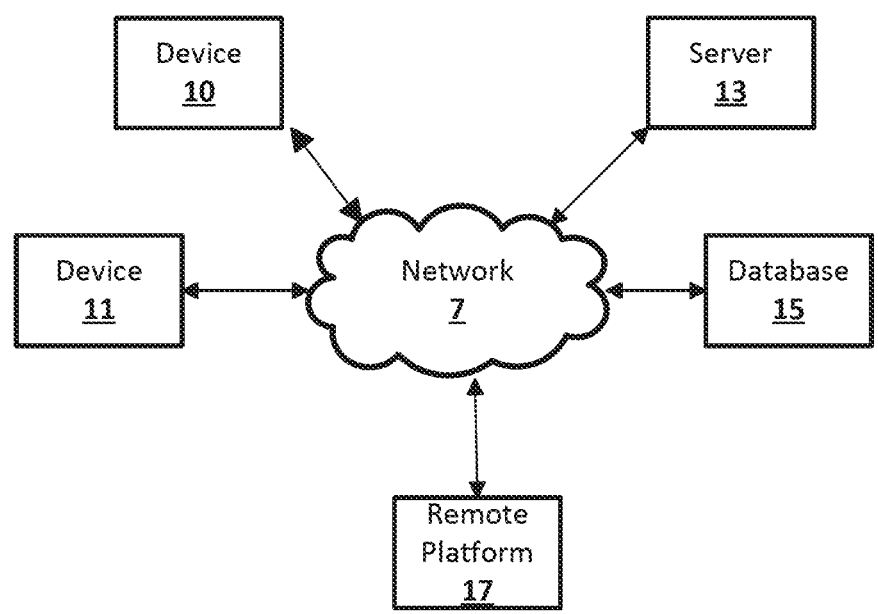
FIG. 4 shows a network configuration according to an embodiment of the disclosed subject matter.

Many other devices or components (not shown) may be connected in a similar manner (e.g., document scanners, digital cameras and so on). Conversely, all the components shown in FIG. 3 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

FIG. 4 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 5:
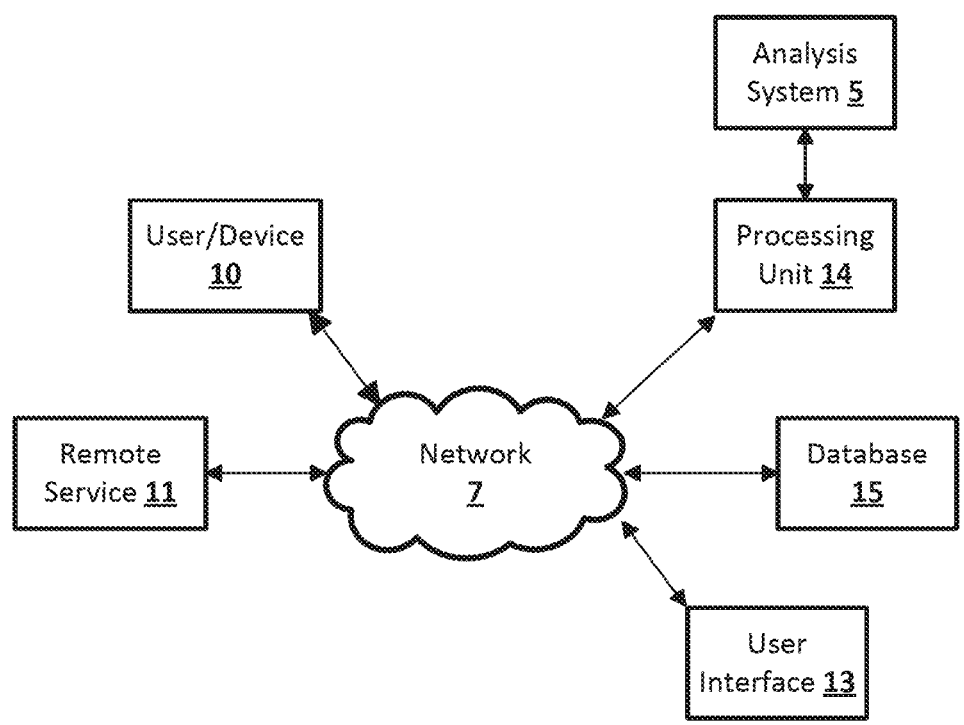
FIG. 5 shows an example network and system configuration according to an embodiment of the disclosed subject matter.

FIG. 5 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method using a contextual multi-armed bandit model, the method comprising:
    receiving customer data corresponding to a first customer of a plurality of customer, the customer data stored in a memory storage device and including a plurality of historic customer interaction points;
    identifying a first customer behavior based on two or more customer interaction points of the plurality of historic customer interaction points;
    identifying a goal of the first customer based on the first customer behavior, the goal based on a second customer behavior of a second customer of the plurality of customer;
    determining, through use of a multi-armed bandit model, a plurality of customer propensities that the first customer will meet each of a plurality of objectives based on the goal;
    assigning a policy from a plurality of policies to the first customer based on scoring each of the plurality of objectives from the plurality of customer propensities, the policy based on a mapping between the customer data and one or more actions of a plurality of actions associated with the policy;
    outputting to the first customer a recommended next action from the plurality of actions associated with the assigned policy;
    receiving a new customer interaction point from the first customer and responsive to the recommended next action; and
    iterating the method using the contextual multi-armed bandit model to recommend a new recommended next action as customer data is updated.

2. The method of claim 1, wherein the interaction points include customer interactions and customer non-interactions of the first customer.

3. The method of claim 1, wherein outputting the recommended next action further comprises prompting the first customer to provide additional information.

4. The method of claim 1, wherein outputting the recommended next action further comprises prompting the first customer to complete a transaction.

5. The method of claim 1, wherein the assigned policy corresponds to a first objective of the plurality of objectives having a greater probability that the first customer will meet the first objective than a second objective of the plurality of objectives.

6. The method of claim 1, wherein the assigned policy is a policy of a second type and is assigned based on determining that a policy of a first type could not be identified.

7. The method of claim 1, wherein the outputting the recommended next action further comprises determining that the recommended next action is more suitable for the first customer than another action of the plurality of actions.

8. The method of claim 1, wherein a first objective of the plurality of objectives comprises two or more stages.

9. The method of claim 8, further comprising rewarding the first customer in response to advancing to a subsequent stage from a prior stage, the subsequent stage being progressively closer to fulfilling the objective than the prior stage.

10. A system comprising:
    a memory storage device configured to store customer data corresponding to a first customer of a plurality of customers and a plurality of historic customer interaction points;
    one or more processors implementing a contextual multi-armed bandit model configured to:
        identify, using a first model, a first customer behavior based on two or more customer interaction points of the plurality of historic customer interaction points;
        identify, using the first model, a goal of the first customer based on the first customer behavior, the goal based on a second customer behavior of a second customer of the plurality of customers;
        determine, through use of a multi-armed bandit model and using the first model, a plurality of customer propensities that the first customer will meet each of a plurality of objectives based on the goal;
        assign, using the first model, a policy from a plurality of policies to the first customer based on scoring each of the plurality of objectives from the plurality of customer propensities, the policy based on a mapping between the customer data and one or more actions of a plurality of actions associated with the policy;
        output to the first customer, using a second model, a recommended next action from the plurality of actions associated with the assigned policy;
        receive a new customer interaction point from the first customer responsive to the recommended next action; and
        iterating the contextual multi-armed bandit model to recommend a new recommended next action as customer data is updated.

11. The system of claim 10, wherein the customer interaction points include customer interactions and customer non-interactions of the first customer.

12. The system of claim 10, wherein the outputting of the recommended next action prompts the customer to provide additional information.

13. The system of claim 10, wherein the outputting of the recommended next action prompts the customer to complete a transaction.

14. The system of claim 10, wherein the assigned policy corresponds to a first objective of the plurality of objectives having a greater probability that the customer will meet the first objective than a second objective of the plurality of objectives.

15. The system of claim 10, wherein the assigned policy is a policy of a second type and is assigned based on determining that a policy of a first type could not be identified.

16. The system of claim 10, wherein the one or more processors are further configured to determine that the recommended next action is more suitable for the customer than another action of the plurality of the actions.

17. The system of claim 11, wherein a first objective of the plurality of objectives comprises two or more stages.

18. The system of claim 17, wherein the one or more processors are further configured to reward the customer in response to advancing to a subsequent stage from a prior stage, the subsequent stage being progressively closer to fulfilling the objective than the prior stage.

\* \* \* \* \*